M. LISCHKE.
MACHINE FOR LEVELING A PLASTIC COVERING ON FLOORS.
APPLICATION FILED JAN. 28, 1908.

910,073.  Patented Jan. 19, 1909.

UNITED STATES PATENT OFFICE.

MAX LISCHKE, OF DUSSELDORF, GERMANY.

MACHINE FOR LEVELING A PLASTIC COVERING ON FLOORS.

No. 910,073.     Specification of Letters Patent.     Patented Jan. 19, 1909.

Application filed January 28, 1908. Serial No. 413,038.

*To all whom it may concern:*

Be it known that I, MAX LISCHKE, a citizen of Germany, residing at Dusseldorf, Germany, have invented new and useful Improvements in Machines for Leveling a Plastic Covering on Floors, of which the following is a specification.

A mode of applying plastic compositions, such as plaster paris coverings, cork coverings and the like so as not to show any joints, by the aid of rollers in a machine or frame mounted in a frame, is already known. In this machine the wheels are placed on each side of the roller, so that one of the rails for the wheels, has to be placed on an already covered part of the floor, which has a disadvantage of precluding a further layer being put down until the last applied is dry, in order not to mark it, whereby much time is lost. There is also the further disadvantage that the covering which is newly laid on, does not unite to form an even surface with the already hardened part, but forms squares or stripes over the floor. These serious disadvantages are avoided by the present invention, by the wheels carrying the frame being fixed at one side of the rollers, so that the rails are laid beside the freshly covered strip. In this manner the work can be carried out expeditiously and the fresh covering of each strip unites with the last one to form a perfect surface.

Figure 1:
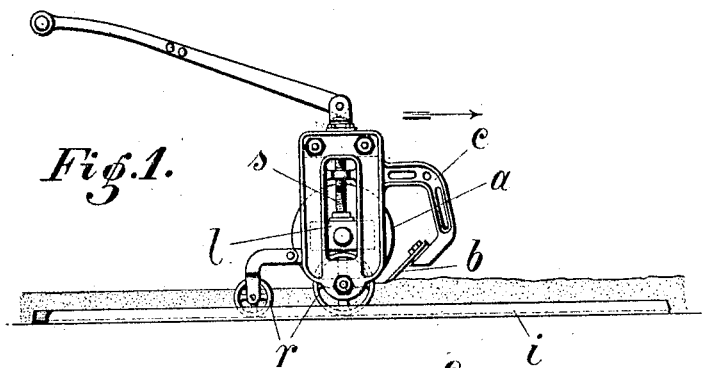
Figure 2:
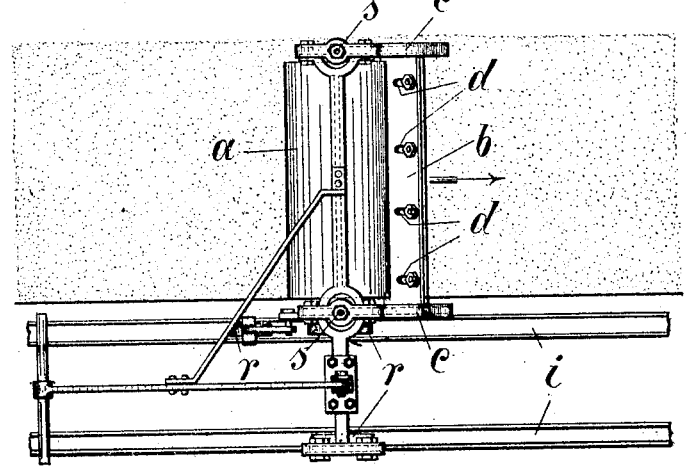
Figure 3:
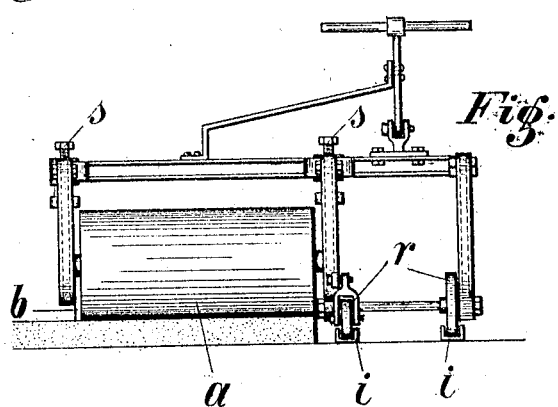

The accompanying drawing shows the device in Figure 1 a side elevation, in Fig. 2 a ground plan and in Fig. 3 a rear elevation.

As shown by the drawing, 2 U-iron rail $i$ serve to guide the wheels, but other rails or straight pieces of wood may be employed. The wheels or casters $r$ of the frame are on one side of the roller $a$. The frame, or carriage as illustrated, is provided with three wheels, but four can be used if desired. As the frame runs on two rails and is supported by the wheels, it cannot, so long as the wheels keep the rails, deviate from its course. The device is further provided with a scraper $b$, which is so fixed that it takes off the excess material laid on the floor and fills in the hollows with it. The scraper, then, in the first place, gives a smooth surface to the composition &c., which is then rolled out to an equal layer and pressed together by the roller. The scraper $b$ is adjustably fixed in the arms $c$, so that it can be set exactly to the thickness desired to lie on the floor. In order to facilitate the adjustment of the scraper, it is provided with 2 slots $d$ through which pass the securing bolts, but the adjustment may be effected in any other suitable and convenient manner. The roller, as well as the scraper, can be raised and lowered. The bearings L of the roller can be set by the screws $s$.

I claim:

1. A device of the character described, comprising a track, a carriage movable thereon, a roller, and means on the carriage for supporting the roller on one side of the track, substantially as specified.

2. A device of the character described, comprising a track, a carriage movable thereon and having a bearing at one side of the track, and a roller journaled in said carriage and bearing, substantially as specified.

3. A device of the character described, comprising a track, a carriage movable thereon, a roller, a scraper, and means on the carriage for supporting said roller and scraper on one side of the track, substantially as specified.

Signed by me at Dusseldorf (Germany) this fourteenth day of January 1908.

MAX LISCHKE.

Witnesses:
    PETER LIEBER,
    WILHELM FLASCHE.